Sept. 28, 1965             A. F. GAWRON             3,209,228
SYSTEM FOR CONTROLLING ELECTRIC MOTORS
IN POWER TOOLS AND THE LIKE
Filed Sept. 28, 1962
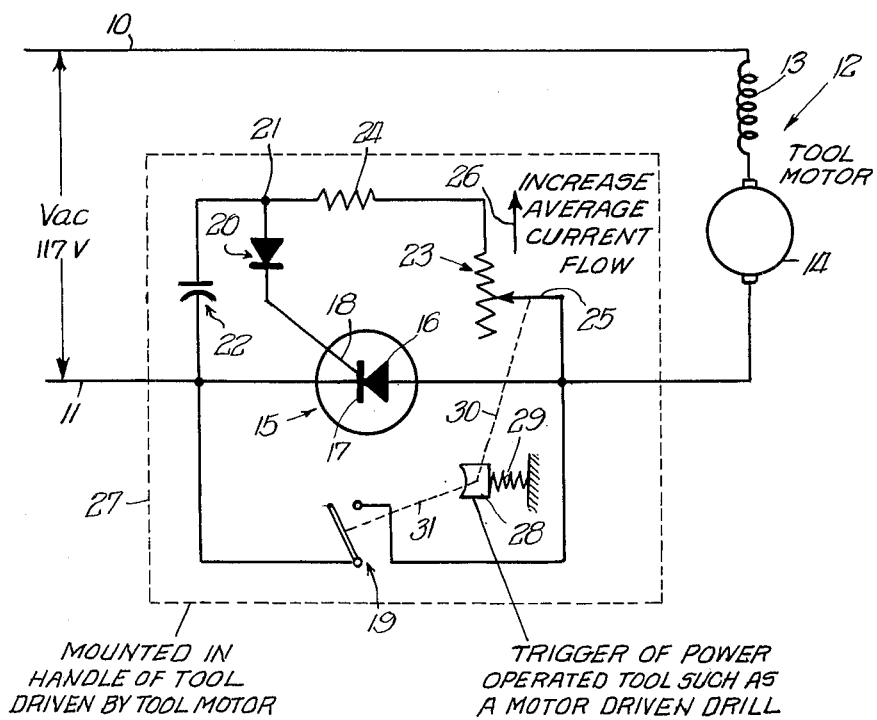
INVENTOR.
Alex F. Gawron,
BY
Cromwell, Greist + Warden
ATTYS United States Patent Office 3,209,228
Patented Sept. 28, 1965

3,209,228
SYSTEM FOR CONTROLLING ELECTRIC MOTORS IN POWER TOOLS AND THE LIKE
Alex F. Gawron, Chicago, Ill., assignor to Skil Corporation, Chicago, Ill., a corporation of Delaware
Filed Sept. 28, 1962, Ser. No. 226,956
4 Claims. (Cl. 318—345)

This invention relates, generally, to electric motor control systems and it has particular relation to the control of the voltage and current applied to, and thereby the speed of, such well known electric motor driven tools, as a universal motor driven hand drill, reciprocating saw, sander, or the like. For example, Papworth Patent 2,931,402 dated April 5, 1960, discloses a reciprocating saw in which the invention can be incorporated.

Among the objects of this invention are: To provide for controlling the flow of current from an alternating current source to a load device, such as a universal motor in a hand manipulated drill or other tool of the class described, in a new and improved manner; to employ for this purpose a silicon controlled rectifier in series with the motor; to provide a capacitor for triggering the silicon controlled rectifier at a predetermined time in a half cycle of alternating current that it is adapted to conduct by varying the time rate at which voltage is applied to the capacitor in the half cycle; to vary the time rate by a variable resistor or potentiometer connected in series with the capacitor with the series combination being connected across the silicon controlled rectifier; to mount the motor and control devices in series therewith on the handle of a power driven tool; to provide a trigger on the handle connected to the variable resistor for varying the resistance in series with the capacitor; to provide a switch for shunting the silicon controlled rectifier; and to mount the switch on the handle and interconnect it and the variable resistor with the trigger in such manner that the switch is closed when the resistance in series with the capacitor has been reduced to a predermined value.

In the drawing the single figure illustrates, diargrammatically, a preferred embodiment of this invention.

In the diagram of circuit connections the reference characters 10 and 11 designate conductors that are energized from a suitable source of alternating current operating at a frequency of 60 cycles and at a voltage of 117 volts. The frequency and voltage here mentioned are conventional and typical of the alternating current source that can be employed for energizing the system embodying the present invention. Connected for energization between the conductors 10 and 11 is a load device, indicated generally at 12, that is in the form of a universal or series type motor. The motor 12 includes a series field winding 13 and an armature winding 14, these windings being connected in series in accordance with conventional practice.

In order to control the flow of current to the load device 12 and the voltage applied thereto a silicon controlled rectifier, indicated generally at 15, is connected in series circuit relation with the load device 12. The silicon controlled rectifier 15 includes an anode 16, a cathode 17 and a gate or control electrode 18. It will be understood that the silicon controlled rectifier 15 acts to conduct half cycles of alternating current of one polarity and to block the flow of the half cycles of the alternating current of opposite polarity. When it is desired to apply both half cycles of alternating current at the voltage existing between the condutcors 10 and 11 to the load device 12, a switch, shown generally at 19, can be closed. It will be observed that the switch 19 is connected in shunt with the silicon controlled rectifier 15 and that, when it is closed, the load device 12 is energized directly from the conductors 10 and 11 without the interposition of the silicon controlled rectifier 15.

In order to cause the silicon controlled rectifier 15 to become conducting in the half cycle of the alternating current that it is adapted or forward biased to conduct a control or trigger diode 20 is connected to the gate or control electrode 18. The control or trigger diode 20 is interposed between the gate or control electrode 18 and a common connection 21 between a capacitor 22, which is connected to the cathode 17 of the silicon controlled rectifier 15, and a variable resistor or potentiometer 23 that is connected to the anode 16 of the silicon controlled rectifier 15. A limiting resistor 24 can be provided between the common connection 21 and the variable resistor or potentiometer 23 to make certain that the voltage in this portion of the circuit is maintained above a predetermined minimum voltage.

The variable resistor or potentiometer 23 has an adjustable contact 25 that is movable to vary the resistance in series with the capacitor 22 for the purpose of varying the time rate voltage build up on the capacitor 22 in the half cycle during which the silicon controlled rectifier 15 is adapted to conduct a half cycle of the alternating current. When the adjustable contact 25 is moved in the direction indicated by the arrow 26, the voltage applied to the capacitor 22 is increased with the result that the silicon controlled rectifier 15 is rendered conducting at an earlier point in the half cycle of alternating current that it is adapted to conduct with the result that the voltage and current applied to the load device 12 are correspondingly increased. When the adjustable contact 25 is moved in the opposite direction there is a corresponding reduction in the voltage and current applied to the load device 12. Since only a relatively small amonut of current flow takes place through the variable resistor or potentiometer 23 and since the voltage drop across the silicon controlled rectifier 15 is relatively small, the amount of heat generated is correspondingly small. As a result the control devices associated with the silicon controlled rectifier 15 and the silicon controlled rectifier 15 itself can be mounted in a handle or other convenient portion of the tool, indicated by the broken line outline at 27, of the power driven tool with the load device in the form of the universal or series type motor 12 being mounted on the handle in conventional manner. Because of the relatively low heat dissipation of the control circuits, the amount of heat developed is relatively small and not uncomfortable to the hand of the operator grasping the handle. If heating is apt to be a problem, the circuits may be mounted in the cooling jet stream of the motor housing.

It is desirable that the resistance of the variable resistor or potentiometer 23 be variable under the control of the operator. For this purpose a trigger 28 is employed and it is slidably mounted on the handle in accordance with conventional practice. A spring 29 serves to bias the trigger 28 to the non operated position against a stop (not shown). A mechanical connection, indicated by broken line 30, interconnects the trigger 28 with the adjustable contact 25 with the arrangement being such that as the trigger 28 is depressed against the spring 29, the adjustable contact 25 is moved in the direction indicated by the arrow 26 to reduce the resistance in the circuit including the capacitor 22 for the purpose of obtaining an increase in the voltage and current applied to the load device 12 in the manner outlined above. A mechanical connection, indicated by the broken line 31, serves to interconnect the trigger 28 and the switch 19 with the arrangement being such that, when maximum voltage and current have been applied to the load device 12 by the control of the silicon controlled rectifier 15, further and maximum voltage and current are applied by closure of the switch 19. As pointed out above this places the load device 12 directly across the line conductors 10 and 11 so that the full system voltage is applied.

As it is apparent to those skilled in the art, the circuit shown and described does not have inherent speed feedback. However, essentially constant speed under varying load conditions can be readily obtained by manipulation of the trigger which is under the operator's control at all times during operation of the tool.

What is claimed as new is:

1. In an electrical control system, the combination with an electric motor having series connected armature and field windings, which motor is mounted in a tool housing having a handle portion, of a silicon controlled rectifier in series circuit relation with said motor and the series combination arranged and adapted for energization from an alternating current source; said rectifier including an anode, a cathode and a gate; a series connected variable resistor and capacitor connected respectively to said anode and cathode, a connection interconnecting said gate and the common connection between said resistor and said capacitor, variation in the resistance of said resistor in series with said capacitor effecting a corresponding change in the voltage and current applied to said motor, said devices connected in series with said motor being mounted in said handle portion, and a trigger on said portion connected to said variable resistor for changing the resistance in series with said capacitor, manipulation of said trigger serving as the sole means for controlling the speed of said motor.

2. In an electrical control system, the combination with an electric motor having series connected armature and field windings, which motor is mounted in a tool housing having a handle portion, of a silicon controlled rectifier in series circuit relation with said motor and the series combination arranged and adapted for energization from an alternating current source; said rectifier including an anode, a cathode and a gate; a series connected variable resistor and capacitor connected respectively to said anode and cathode, a connection interconnecting said gate and the common connection between said resistor and said capacitor, variation in the resistance of said resistor in series with said capacitor effecting a corresponding change in the voltage and current applied to said motor, a switch connected in shunt circuit relation with said silicon controlled rectifier and when closed causing said motor to be energized directly from said current source, said devices connected in series with said motor and said switch being mounted in said handle portion, and a trigger on said handle portion connected to said variable resistor for changing the resistance in series with said capacitor and to said switch for closing it when said resistance has been reduced a predetermined extent, said variable resistor in series with said capacitor constituting the sole means for changing the voltage and current applied to said motor.

3. In combination, a hand manipulated power tool having a housing with a handle portion, wherein the tool includes an electric motor with series connected armature and field windings, an electrical control system for said motor, which control system is mounted in said housing and includes, a silicon controlled rectifier control circuit in series circuit relation with said motor and arranged and adapted for energization from an alternating current souce, said circuit including a variable resistor for varying the voltage and current applied to said motor thereby to control the speed thereof, a trigger supported on said handle portion, said trigger being mechanically connected to the movable element of said resistor for operation of the latter upon actuation of the trigger, whereby said control system is actuated by said trigger for controlling the speed of said motor, variation in the voltage and current applied to said motor being accomplished solely through operation of said variable resistor by said trigger.

4. In combination, a hand manipulated power drill including a housing having a hollow handle, wherein the drill includes an electric motor with series connected armature and field windings, an electrical control system mounted in said hollow handle and including, a silicon controlled rectifier control circuit in series circuit relation with said motor and arranged and adapted for energization from an alternating current source, said circuit including a variable resistor for varying the voltage and current applied to said motor thereby to control the speed thereof, a trigger supported on said handle, said trigger being mechanically connected to the movable element of said resistor so that as the trigger is depressed the resistance of said resistor is reduced thereby to increase the speed of said motor, variation in the voltage and current applied to said motor being accomplished solely through operation of said variable resistor by said trigger.

References Cited by the Examiner

UNITED STATES PATENTS 2,419,431 4/47 Williams _____ 318—212 X
3,103,618 9/63 Slater _____ 318

FOREIGN PATENTS 242,179 12/62 Australia.

OTHER REFERENCES

Publication: Gutzwiller, G.E. Application Note 200.4, 6/61, Universal Motor Speed Controls, June 1961.

ORIS L. RADER, *Primary Examiner.*